(12) United States Patent
Ouellette et al.

(10) Patent No.: US 11,460,993 B2
(45) Date of Patent: Oct. 4, 2022

(54) DISPLAYING PERFORMANCE LIMITATIONS IN AIRCRAFT DISPLAY

(71) Applicant: BOMBARDIER INC., Dorval (CA)

(72) Inventors: Benoit Ouellette, Verdun (CA); Philippe Doyon-Poulin, Montreal (CA)

(73) Assignee: BOMBARDIER INC., Dorval (CA)

( * ) Notice: Subject to any disclaimer, the term of this patent is extended or adjusted under 35 U.S.C. 154(b) by 33 days.

(21) Appl. No.: 16/305,577

(22) PCT Filed: May 31, 2017

(86) PCT No.: PCT/IB2017/053215
§ 371 (c)(1),
(2) Date: Nov. 29, 2018

(87) PCT Pub. No.: WO2017/208179
PCT Pub. Date: Dec. 7, 2017

(65) Prior Publication Data
US 2020/0192559 A1    Jun. 18, 2020

Related U.S. Application Data

(60) Provisional application No. 62/343,260, filed on May 31, 2016.

(51) Int. Cl.
*G06F 3/048* (2013.01)
*G06F 3/04847* (2022.01)
(Continued)

(52) U.S. Cl.
CPC ......... *G06F 3/04847* (2013.01); *B64D 43/00* (2013.01); *G08G 5/0021* (2013.01); *G09G 5/377* (2013.01); *G09G 2354/00* (2013.01)

(58) Field of Classification Search
CPC .. G06F 3/04847; B64D 43/00; G08G 5/0021; G09G 5/377
(Continued)

(56) References Cited

U.S. PATENT DOCUMENTS 5,808,563 A * 9/1998 Ching .................. G05D 1/0676
340/971
6,842,122 B1 * 1/2005 Langner .............. G01C 23/005
340/945
(Continued)

FOREIGN PATENT DOCUMENTS

CN      103562682 A    2/2014
CN      104376744 A    2/2015
(Continued)

OTHER PUBLICATIONS

International Search Report and Written Opinion issued in PCT application No. PCT/IB2017/053215.
(Continued)

*Primary Examiner* — David Phantana-angkool
(74) *Attorney, Agent, or Firm* — Norton Rose Fulbright Canada LLP (57) ABSTRACT

The present disclosure describes displaying on a flight deck (12) graphical presentations indicative of performance limitations of an aircraft (10) resulting from an in-flight aircraft reconfiguration. The graphical presentations are co-located on the flight deck (12) with the graphical presentations of the aircraft (10) and/or system (34) parameters to which the performance limitations apply.

16 Claims, 6 Drawing Sheets

(51) Int. Cl.
  *B64D 43/00* (2006.01)
  *G08G 5/00* (2006.01)
  *G09G 5/377* (2006.01)
(58) Field of Classification Search
  USPC .......................................................... 715/771
  See application file for complete search history.

(56) References Cited

U.S. PATENT DOCUMENTS

| | | | | |
|---|---|---|---|---|
| 6,946,976 | B1* | 9/2005 | Langner | G01C 23/00 |
| | | | | 340/945 |
| 8,321,078 | B2* | 11/2012 | Vial | G05B 23/0272 |
| | | | | 340/945 |
| 8,378,852 | B2* | 2/2013 | Naimer | G01C 23/00 |
| | | | | 340/500 |
| 8,514,104 | B1 | 8/2013 | Dirks et al. | |
| 8,751,068 | B2* | 6/2014 | Barraci | G06Q 50/30 |
| | | | | 701/3 |
| 9,002,541 | B2 | 4/2015 | Fezzazi et al. | |
| 9,205,931 | B1 | 12/2015 | Kawalkar | |
| 9,440,747 | B1* | 9/2016 | Welsh | G05D 1/0061 |
| 10,279,890 | B2* | 5/2019 | De Bossoreille | G06F 3/041 |
| 10,360,741 | B2* | 7/2019 | Huet | B64D 45/00 |
| 10,569,899 | B2* | 2/2020 | Deseure | G06Q 50/30 |
| 10,906,633 | B2* | 2/2021 | Gauvain | G05D 1/0808 |
| 11,193,428 | B2* | 12/2021 | Pekovic | G05B 19/0425 |
| 11,334,829 | B2* | 5/2022 | Conaway | G06F 16/26 |
| 2004/0254747 | A1* | 12/2004 | Vollum | G01L 3/24 |
| | | | | 702/50 |
| 2010/0204855 | A1* | 8/2010 | Vial | G01C 23/005 |
| | | | | 701/14 |
| 2014/0316613 | A1* | 10/2014 | Jang | G05B 23/0286 |
| | | | | 701/3 |
| 2015/0054664 | A1 | 2/2015 | Dupont De Dinechin | |
| 2015/0261379 | A1* | 9/2015 | Kneuper | G01C 23/00 |
| | | | | 345/173 |
| 2015/0298816 | A1 | 10/2015 | Ouellette et al. | |
| 2016/0102994 | A1 | 4/2016 | Brenner et al. | |
| 2016/0111007 | A1* | 4/2016 | Dennerline | G08G 5/0026 |
| | | | | 701/528 |
| 2017/0272148 | A1* | 9/2017 | Wang | G01S 13/953 |
| 2018/0232097 | A1* | 8/2018 | Kneuper | G08G 5/0034 |
| 2019/0352018 | A1* | 11/2019 | Bohanan | G06F 3/0362 |
| 2020/0105145 | A1* | 4/2020 | Feyereisen | G08G 5/0078 |
| 2020/0110523 | A1* | 4/2020 | Urbanski | G01C 23/005 |
| 2020/0116521 | A1* | 4/2020 | Barber | G01C 23/005 |
| 2020/0168104 | A1* | 5/2020 | Holder | G08G 5/0039 |
| 2020/0183382 | A1* | 6/2020 | Schwindt | G08G 5/0052 |
| 2020/0192559 | A1* | 6/2020 | Ouellette | B64D 43/00 |
| 2020/0319779 | A1* | 10/2020 | Staggs | G06F 3/14 |
| 2020/0355518 | A1* | 11/2020 | Bilek | B64D 43/00 |

FOREIGN PATENT DOCUMENTS

| | | | | |
|---|---|---|---|---|
| CN | 105278540 | A | 1/2016 | |
| EP | 1884852 | A1 * | 2/2008 | G08G 5/0052 |
| EP | 1884852 | | 5/2009 | |
| WO | 2004006203 | | 1/2004 | |
| WO | WO-2017208179 | A1 * | 12/2017 | G01C 23/005 |
| WO | WO-2019119139 | A1 * | 6/2019 | B64D 45/00 |

OTHER PUBLICATIONS

China National Intellectual Property Administration, Notification of First Office Action dated Oct. 18, 2021 re: Chinese Patent Application No. 201780033942.1.
English translation of China patent document No. CN104376744A dated Feb. 25, 2015, https://patents.google.com/patent/CN104376744A/en?oq=CN104376744A, accessed on Mar. 8, 2022.
English translation of China patent document No. CN105278540A dated Jan. 27, 2017, https://patents.google.com/patent/CN105278540A/en?oq=CN105278540A, accessed on Mar. 8, 2022.
English translation of China patent document No. CN103562682A dated Feb. 5, 2014, https://patents.google.com/patent/CN103562682A/en?oq=CN103562682A, accessed on Mar. 8, 2022.

* cited by examiner

DISPLAYING PERFORMANCE LIMITATIONS IN AIRCRAFT DISPLAY

CROSS-REFERENCE TO RELATED APPLICATIONS

The present application claims the benefit of U.S. Provisional Patent Application No. 62/343,260 filed on May 31, 2016, the contents of which are hereby incorporated by reference.

TECHNICAL FIELD

The present invention relates generally to aircraft displays, and more particularly to a pilot support system for addressing non-normal events.

BACKGROUND OF THE ART

Aircraft pilots have many tasks to perform. The workload varies throughout a flight, from low to high, even during a routine flight. When a non-normal event arises, such as adverse weather conditions or aircraft malfunctions, pilots have a particularly high workload as they need to multi-task effectively.

Various tools exist to help pilots manage tasks throughout a flight. For example, checklists are sometimes generated and displayed to the pilot. Cross-checking and read-back procedures are also put in place to help pilots eliminate errors.

Despite these tools, there is room for improvement to assist pilots and further mitigate potential problems.

SUMMARY

The present disclosure describes displaying on a flight deck graphical presentations indicative of performance limitations of an aircraft resulting from an in-flight aircraft reconfiguration. The graphical presentations are co-located on the flight deck with the graphical presentations of the aircraft and/or system parameters to which the performance limitations apply.

In accordance with a first aspect, there is provided a method comprising acquiring reconfiguration information of an aircraft upon detection of a non-normal event in-flight, the reconfiguration information comprising at least one performance limitation of at least one aircraft or system parameter as a result of the non-normal event; and displaying a graphical indicator of the at least one performance limitation co-located with a display of the at least one aircraft or system parameter.

In some embodiments, the graphical indicator corresponds to a prescription of a checklist generated as a result of the non-normal event.

In some embodiments, displaying the graphical indicator of the at least one performance limitation comprises overlaying the indicator on the display of the at least one aircraft or system parameter.

In some embodiments, the method further comprises dynamically adapting display of the graphical indicator of the at least one performance limitation as a function of at least one context-specific condition.

In some embodiments, the method further comprises updating display of the graphical indicator of the at least one performance limitation when the at least one context-specific condition changes.

In some embodiments, the context-specific condition is a flight phase in which the aircraft is currently operating.

In some embodiments, displaying the graphical indicator comprises selecting a symbol for the graphical indicator as a function of at least one of the at least one performance limitation and the at least one aircraft or system parameter.

In some embodiments, displaying the graphical indicator of the least one performance limitation comprises displaying an available range of the at least one aircraft or system parameter in relation to a current value of the at least one aircraft or system parameter.

In some embodiments, the method further comprises receiving a request to display the at least one performance limitation parameter.

In some embodiments, the request is formulated within a checklist generated as a result of the non-normal event.

In accordance with a further aspect, there is provided a system comprising a processing unit and a memory communicatively coupled to the processing unit and comprising computer-readable program instructions. The instructions are executable by the processing unit for acquiring reconfiguration information of an aircraft upon detection of a non-normal event in-flight, the reconfiguration information comprising at least one performance limitation of at least one aircraft or system parameter as a result of the non-normal event; and displaying a graphical indicator of the at least one performance limitation co-located with a display of the at least one aircraft or system parameter.

In some embodiments, the graphical indicator corresponds to a prescription of a checklist generated as a result of the non-normal event.

In some embodiments, displaying the graphical indicator of the at least one performance limitation comprises overlaying the graphical indicator on the display of the at least one aircraft or system parameter.

In some embodiments, the computer-readable program instructions are further executable for dynamically adapting display of the graphical indicator of the at least one performance limitation as a function of at least one context-specific condition.

In some embodiments, the computer-readable program instructions are further executable for updating the graphical indicator of the at least one performance limitation when the at least one context-specific condition changes.

In some embodiments, the context-specific condition is a flight phase in which the aircraft is currently operating.

In some embodiments, displaying the graphical indicator comprises selecting a symbol for the indicator as a function of at least one of the at least performance limitation and the at least one aircraft or system parameter.

In some embodiments, displaying the graphical indicator of the least one performance limitation comprises displaying an available range of the at least one aircraft or system parameter in relation to a current value of the at least one aircraft or system parameter.

In some embodiments, the computer-readable program instructions are further executable for receiving a request to display the at least one performance limitation parameter.

In some embodiments, the request is formulated within a checklist generated as a result of the non-normal event.

In accordance with another broad aspect, there is provided a graphical user interface (GUI) of an aircraft. The GUI comprises a graphical display of at least one aircraft or system parameter, and a graphical indicator of at least one performance limitation co-located with a display of the at least one aircraft or system parameter, the at least one performance limitation resulting from a reconfiguration of the aircraft upon detection of a non-normal event in-flight.

In some embodiments, the graphical indicator corresponds to a prescription of a checklist generated as a result of the non-normal event.

In some embodiments, the graphical indicator is overlaid with the graphical display of the at least one aircraft or system parameter.

In some embodiments, the graphical indicator comprises a symbol associated with at least one of the at least one performance limitation and the at least one aircraft or system parameter.

In some embodiments, the graphical indicator comprises an available range of the at least one aircraft or system parameter in relation to a current value of the at least one aircraft or system parameter.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present disclosure describes systems and methods associated with providing pilot support in response to non-normal events in-flight. It should be understood that the expression "non-normal event" is used herein to refer to events that may be classified as "abnormal", "non-normal", and/or "emergencies". Even though various aspects of the present disclosure are described in the context of aircraft, it is understood that aspects disclosed herein are equally applicable to systems and methods for other vehicles, such as trains, ships and buses for example. In various embodiments, the systems and methods disclosed herein may be considered to embed on a flight deck graphical presentations indicative of performance limitations of the aircraft resulting from an aircraft reconfiguration, in order to complement traditional instruments and displays currently available. The graphical presentations are co-located on the flight deck with the primary graphical presentations of the parameters to which the performance limitations apply.

In various embodiments, the systems and methods disclosed herein may in some situations reduce or eliminate the need for a flight crew to consult one or more source(s) of information, such as a checklist, separate from a primary display of an aircraft. In addition, the systems and methods disclosed herein may reduce or eliminate the need for a flight crew to rely on memory to respect performance limitation parameters of an aircraft resulting from an in-flight reconfiguration of the aircraft. In particular, when a reconfiguration of an aircraft occurs as a result of a non-normal event, the systems and methods disclosed herein will cause indicators representative of performance limitations of the aircraft to be displayed co-located with aircraft or system parameters to which they relate. In some embodiments, the indicators representative of performance limitations may overlay the graphical presentations of the aircraft or system parameters to which the performance limitations apply. Accordingly, in some embodiments, the systems and methods disclosed herein may contribute toward enhancing awareness of the flight crew and reducing the flight crew's workload. Aspects of various embodiments are described through reference to the drawings.

Figure 1:
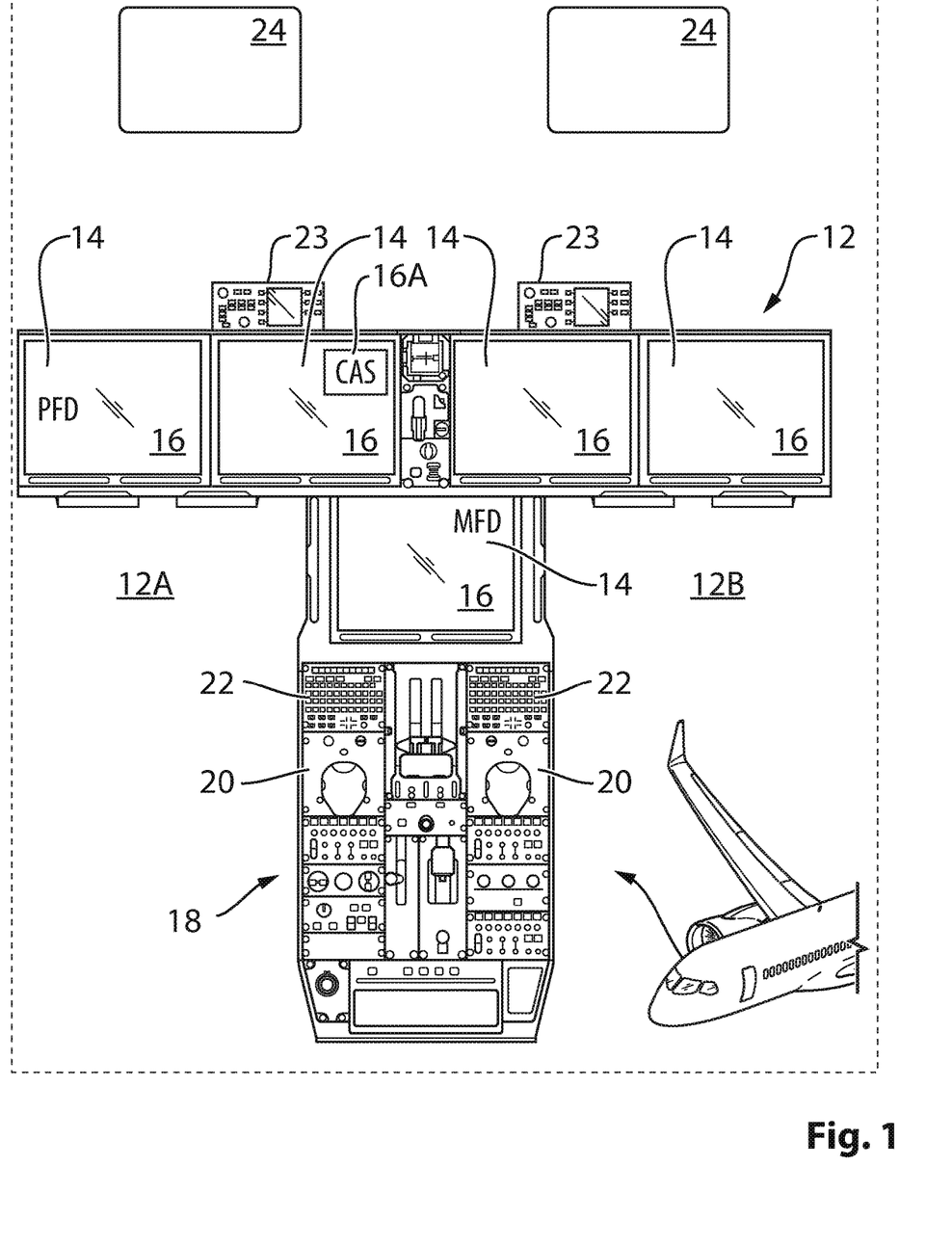
FIG. 1 is a schematic illustration of an aircraft and a flight deck, in accordance with one embodiment.

FIG. 1 shows an exemplary partial schematic representation of a flight deck 12 which may be part of an aircraft 10. Aircraft 10 may be a corporate, private, commercial or any other type of aircraft. For example, aircraft 10 may be a fixed-wing aircraft. In some embodiments, aircraft 10 may be a narrow-body, twin engine jet airliner. Flight deck 12 may comprise additional or fewer elements than those shown and described herein. Flight deck 12 may comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B may comprise functionally identical components so that at least some operational redundancy may be provided between left portion 12A and right portion 12B of flight deck 12. As used herein, the term "flight crew" is intended to encompass one or more individuals responsible for operation of aircraft 10 during flight. Such individuals may, for example, include the pilot and/or the co-pilot. Similarly, the term "crew" is intended to encompass one or more individuals responsible for operation of a vehicle comprising a system as disclosed herein.

Flight deck 12 may comprise one or more display devices 14 providing respective display areas 16. In the exemplary configuration of flight deck 12 shown in FIG. 1, left portion 12A and right portion 12B may each comprise two display devices 14 and an additional display device 14 may be provided in pedestal region 18 of flight deck 12. Display device 14 provided in pedestal region 18 may be shared between the pilot and the co-pilot during normal operation of aircraft 10. Additional display devices 14 may be positioned in a location above a windshield in a heads-up position. Display devices 14 may include one or more cathode-ray tubes (CRTs), liquid crystal displays (LCDs), plasma displays, light-emitting diode (LED) based displays or any known or other type of display device that may be suitable for use in flight deck 12. Display devices 14 may be configured to dynamically display operational and status information about various systems of aircraft 10, information related to flight/mission planning, maps and any other information that may be useful for the flight crew during operation of aircraft 10. Display devices 14 may facilitate dialog between the flight crew and various systems of aircraft 10 via suitable graphical user interfaces. Flight deck 12 may comprise one or more data input devices such as, for example, one or more cursor control devices 20, one or more multi-function keypads 22 and one or more (e.g., standalone or multifunction) controllers 23 that may permit data entry by the flight crew. For example, such controller(s) 23 may be disposed in the glare shield above one or more display devices 14.

Part or all of display areas 16 may be dedicated to a specific type of aircraft display, such as a Primary Flight Display (PFD), a Crew Alerting System (CAS), a Heads Up Display (HUD) an Engine-Indicating and Crew Alerting System (EICAS) and/or a Multi-Function Display (MFD), The PFD displays flight information such as pitch and roll characteristics, aircraft orientation with respect to the horizon, stall angle, a runway diagram, airspeed, altitude, vertical speed, and magnetic heading of the aircraft. Other flight information may also be displayed. The EICAS displays information regarding aircraft engines and other systems instrumentation and crew annunciations. Examples of engine information displayed on the EICAS are revolutions per minute, temperature values, fuel flow and quantity, and oil pressure. Examples of other aircraft systems having parameters displayed on the EICAS are hydraulic, pneumatic, electrical, deicing, environmental, and control surface systems. Other aircraft system information may also be displayed. The MFD displays any additional information used to complement the PFD and/or EICAS. For example, the MFD may display a navigation route, moving map, weather radar, traffic collision avoidance system (TCAS) information, ground proximity warning system (GPWS) information, and airport information. Other complementary information may also be displayed.

Figure 2:
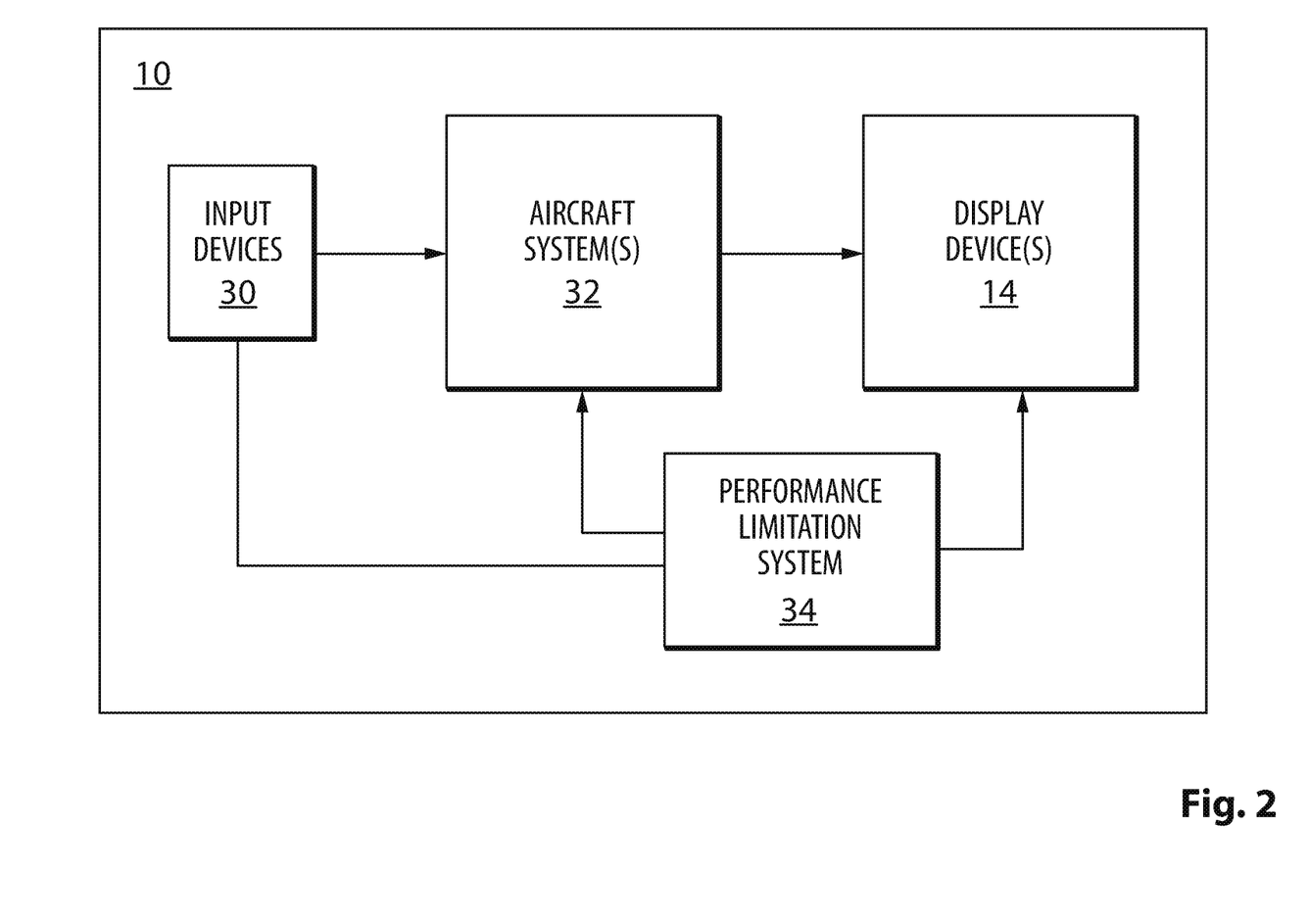
FIG. 2 is a block diagram of the aircraft, in accordance with one embodiment.

FIG. 2 shows a schematic representation of aircraft 10, illustratively comprising input device(s) 30, aircraft system(s) 32, display device(s) 14, and performance limitation system 34. Input devices 30 may include one or more sensors, such as sensors for measuring pressure, position, acceleration, temperature, or the like. Input devices 30 may also comprise one or more of the data input devices provided on the flight deck 12, as illustrated in FIG. 1. One or more sensed parameters and/or one or more data inputs may be provided to aircraft systems 32 via input devices 30. Aircraft systems 32 are operatively connected to display devices 14, for populating the PFD, CAS, HUD, MFD, and any other display 14 provided on the aircraft 10.

At least one of the aircraft systems 32 is a flight control system (not shown). In some embodiments, the flight control system comprises one or more flight computers that receive control inputs and direct movement of flight control surfaces, such as stabilizers, elevators, rudders, ailerons, spoilers, and the like. Different aircraft may be composed of different flight control surfaces. The flight control system is designed to meet aircraft specific performance specifications related to stability augmentation, automatic guidance and navigation, and thrust management. In order to account for fault tolerance, the flight control system is provided with failure and/or fault detection and reconfiguration. When a non-normal event occurs, one or more aircraft systems, components and/or elements may be unable to perform their designed function or meet the performance specifications originally set out, thus leading to a reconfiguration of the flight control system whereby performance limitations are determined. Performance limitations may be related to a specific flight control surface, such as a rudder or an aileron, or to an operating parameter of the aircraft, such as airspeed, altitude, or acceleration. Separate performance limitations may be assigned for each flight control surface having a reduced or modified capability. Separate performance limitations may be assigned for each operating aircraft or system parameter of the aircraft having a reduced or modified capability. Alternatively, a performance limitation may be applicable to more than one aircraft and/or system parameter, as will be explained in more detail below.

The performance limitation system 34 is configured to display a graphical indicator of at least one performance limitation on any one of the existing display devices 14 of the aircraft 10. The graphical indicator of the performance limitation is displayed so as to be co-located with the aircraft or system parameter to which it relates, on a display of the aircraft for the related aircraft or system parameter. The indicator of the performance limitation may be displayed in a manner that overlays, or is superimposed over, a graphical representation of the aircraft or system parameter to which it relates. For example, if the performance limitation is a maximum airspeed for the aircraft that is imposed as a result of a reconfiguration of the aircraft upon detection of a non-normal event in-flight, then a graphical indicator of the maximum airspeed in accordance with the active performance limitation is displayed co-located with the actual airspeed on an airspeed gauge of the PFD. For example, the graphical indicator of the maximum airspeed in accordance with the active performance limitation may be overlaid on an airspeed gauge or scale, so as to visually indicate to a crew member an airspeed not to be exceeded. If the performance limitation is a maximum engine temperature imposed as a result of a reconfiguration of the aircraft upon detection of a non-normal event in-flight, then a graphical indicator of the maximum engine temperature in accordance with the active performance limitation is displayed co-located with the actual engine temperature on a temperature gauge of the CAS. For example, the graphical indicator of the maximum engine temperature in accordance with the active performance limitation may be overlaid on the temperature gauge or scale, so as to visually indicate to a crew member an engine temperature not to be exceeded. The graphical indicator of the performance limitation is provided in addition to all of the information already available on the aircraft instrument, such as an over-speed bar on an airspeed tape or an engine overheating zone on the engine temperature gauge. The performance limitation is dynamically set upon detection of a non-normal event as a result of a reconfiguration of the aircraft. Therefore, the graphical indicator of the performance limitation may only be provided in-situ and differs from pre-set limits for various aircraft and system parameters.

Performance limitation system 34 may be coupled to input devices 30, aircraft systems 32, and display devices 14. Alternatively, performance limitation system 34 is only coupled to one or more of aircraft systems 32, such as a flight control system, and graphical presentations generated by performance limitation system 34 are integrated into display information by one or more of the aircraft systems 32. Also alternatively, performance limitation system 34 is integrated into one of the aircraft systems 32, such as a flight management system (FMS) or flight control system.

Figure 3:
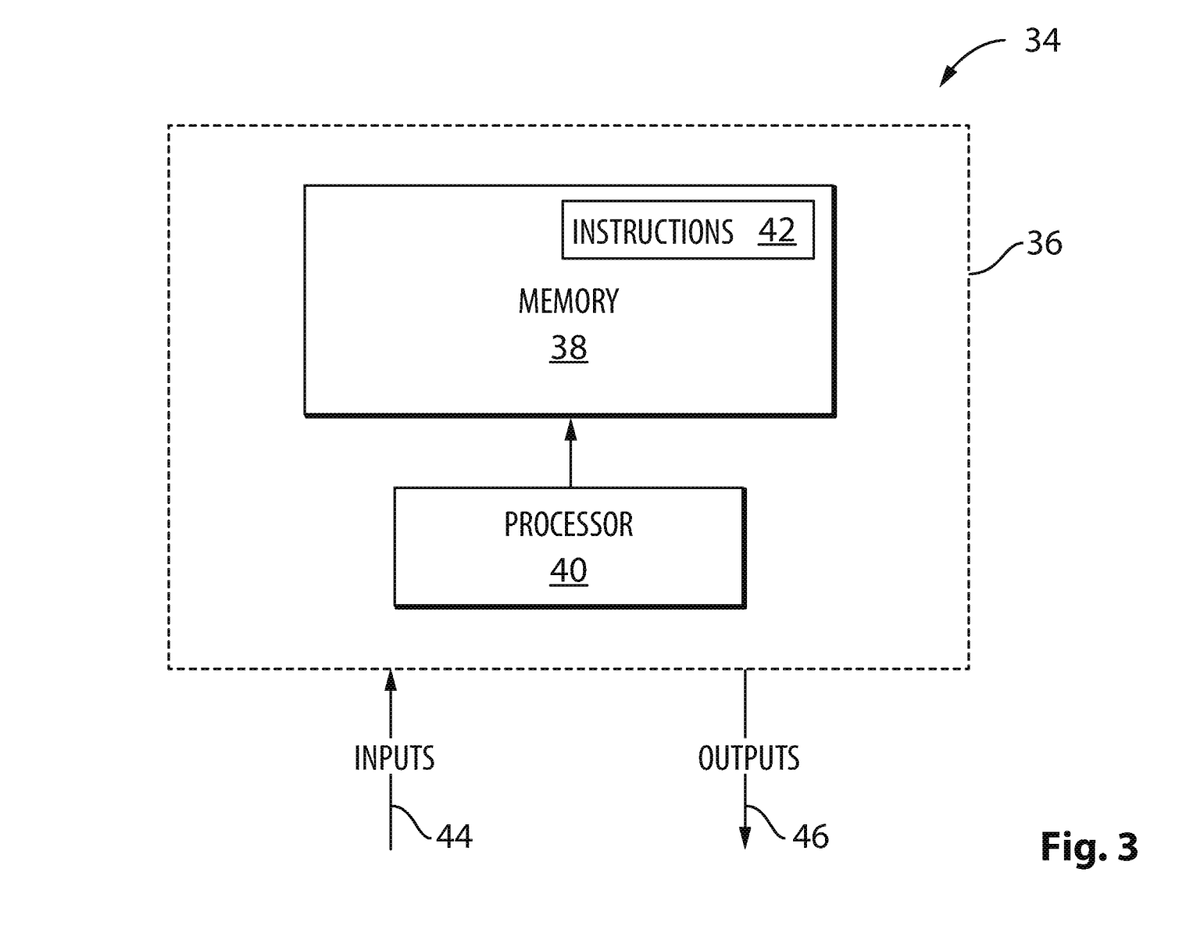
FIG. 3 is a block diagram of a performance limitation system, in accordance with one embodiment.

Referring to FIG. 3, performance limitation system 34 may comprise one or more computers 36. Computer 36 may comprise one or more processors 40 and one or more computer-readable memories 38 storing machine-readable instructions 42 executable by processor 40 and configured to cause processor 40 to generate one or more outputs 46. The outputs 46 may comprise one or more signals for causing display device 14 of aircraft 10 to display one or more indicator of one or more performance limitation. The outputs 46 may also comprise one or more signals for causing one or more aircraft system(s) 32 to cause display device 14 of aircraft 10 to display one or more indicator(s) of one or more performance limitation(s).

Computer 36 may receive inputs 44 in the form of data or information that may be processed by processor 40 based on instructions 42 in order to generate output 46. For example, inputs 46 may comprise information indicative of a non-normal event. Non-normal event information may take the form of one or more logic equations asserted by one or more of the aircraft systems 32. Alternatively, non-normal event information may take the form of a checklist, whether manually generated by pilot or co-pilot input or automatically generated by an aircraft system 32. Non-normal event information may correspond to the generation of the checklist or to actions and/or inputs from the flight crew in response to the checklist. Non-normal event information may also take other forms, such as an alert signal generated by anyone of the aircraft systems 32. Performance limitation system 34 may consider any input 44 or combination of inputs 44 that it has been configured to recognize as indicative of a non-normal event. Detection of non-normal events by the aircraft is undertaken by existing aircraft systems 32 and will not be described in detail herein.

In some embodiments, inputs 44 may alternatively or in addition comprise information indicative of a reconfiguration of the aircraft 10. Reconfiguration information comprises at least one performance limitation of at least one aircraft or system parameter. In some embodiments, reconfiguration information also acts as non-normal event information. Alternatively, reconfiguration information is received separately from non-normal event information. Computer 36 may, based on inputs 44, generate output 46 for causing display device 14 to display one or more indicators of one or more performance limitations co-located, and/or overlaid, with the one or more aircraft or system parameters to which the one or more performance limitations apply.

Computer 36 may be part of an avionics suite of aircraft 10. For example, in some embodiments, computer 36 may carry out additional functions than those described herein, including the management of one or more graphic user interfaces of flight deck 12 and/or other part(s) of aircraft 10. In various embodiments, the methods disclosed herein (or parts thereof) could be performed in parts using a plurality of computers 36 or processors 40, or, alternatively, be performed entirely using a single computer 36 or processor 40. In some embodiments, computer 36 could be physically integrated with (e.g., embedded in) display device 14.

Processor 40 may comprise any suitable device(s) configured to cause a series of steps to be performed by computer 36 so as to implement a computer-implemented process such that instructions 42, when executed by computer 36 or other programmable apparatus, may cause the functions/acts specified in the methods described herein to be executed. Processor 40 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 38 may comprise any suitable known or other machine-readable storage medium. Memory 38 may comprise non-transitory computer readable storage medium such as, but not limited to, an electronic, magnetic, optical, electromagnetic, infrared, or semiconductor system, apparatus, or device, or any suitable combination of the foregoing. Memory 38 may include a suitable combination of any type of computer memory that is located either internally or externally to computer 36 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 38 may comprise any storage means (e.g. devices) suitable for retrievably storing machine-readable instructions 42 executable by processor 40.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g.; memory 38) having computer readable program code (e.g., instructions 42) embodied thereon. The computer program product may, for example, be executed by computer 36 to cause the execution of one or more methods disclosed herein in entirety or in part.

Computer program code for carrying out operations for aspects of the present disclosure in accordance with instructions 42 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 36 or other processing device(s). It is understood that, based on the present disclosure, one skilled in the relevant arts could readily write computer program code for implementing the methods disclosed herein.

Figure 4:
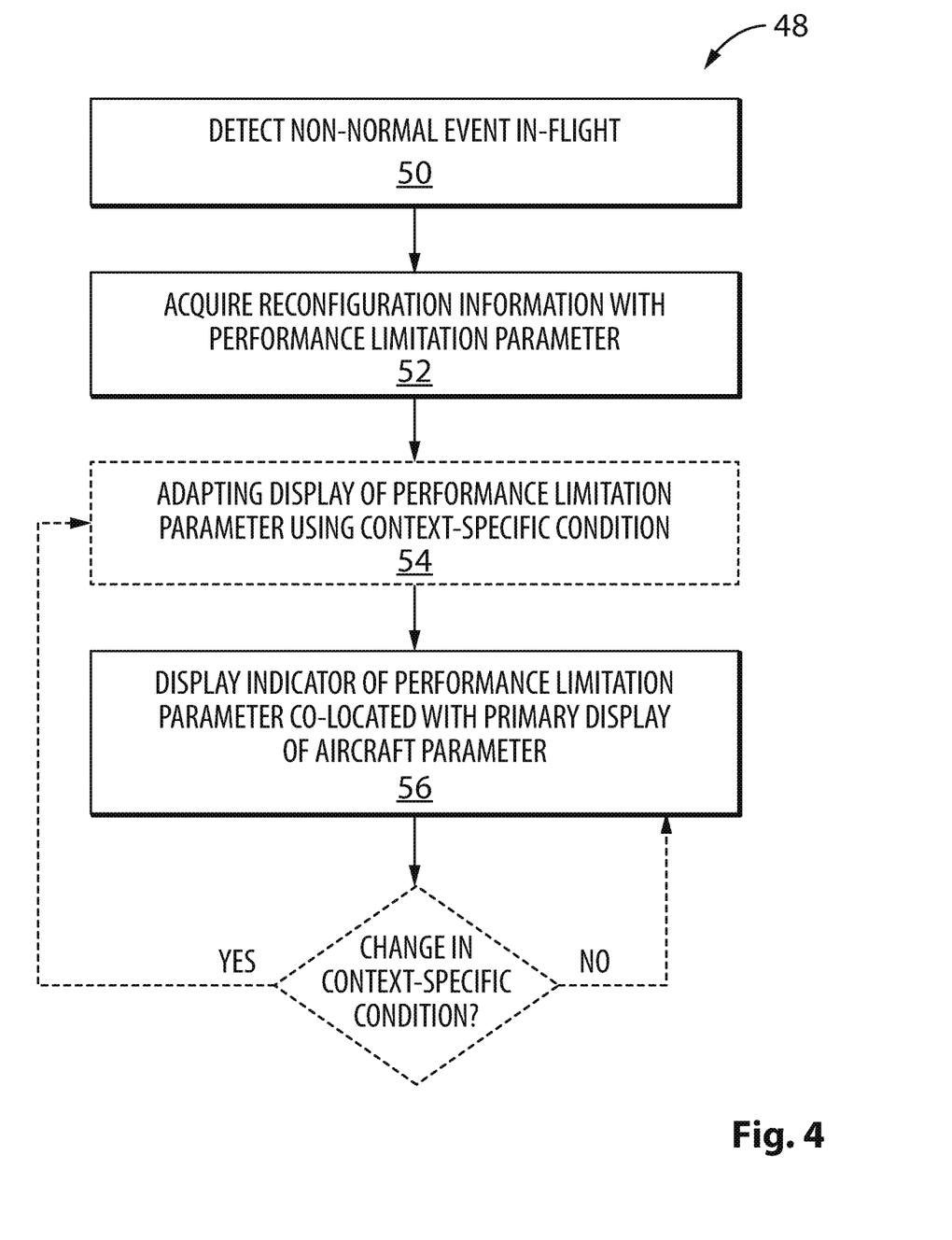
FIG. 4 is flowchart of a method performed by the performance limitation system, in accordance with one embodiment.

Referring to FIG. 4, there is illustrated an example embodiment of a method 48 as performed by the computer 36 of the performance limitation system 34. As per step 50, a non-normal event is detected in-flight. Detection is performed by processing non-normal event information received as inputs 44 to system 34. In some embodiments, the non-normal event information corresponds to a checklist, a checklist action item, or a logic equation asserted by one or more aircraft systems 32. In some embodiments, step 50 is performed by another computer program, provided in computer 36 or in a different computer or system of the aircraft. For example, step 50 may form part of a non-normal event detection system provided in an aircraft.

At step 52, reconfiguration information of the aircraft is acquired. In some embodiments, the performance limitation system 34 will retrieve the reconfiguration information upon detecting the non-normal event in step 50, from memory 38 or from another memory provided in the aircraft 10. Alternatively, the reconfiguration information will be received by the performance limitation system 34, either as part of the non-normal event information or separately therefrom. The reconfiguration information comprises at least one performance limitation of at least one aircraft or system parameter.

At step 56, a graphical indicator of the at least one performance limitation is displayed on a display of the aircraft. The graphical indicator of the at least one performance limitation may be displayed co-located and/or overlaid, with the at least one aircraft or system parameter to which it relates. The graphical indicator may correspond to a prescription of a checklist generated as a result of the non-normal event.

In some embodiments, an optional step 54 is provided in method 48 for adapting a display of the performance limitation parameter using one or more context-specific condition(s). For example, a context-specific condition may include an operating condition of the aircraft, such as altitude for example, or the flight phase of the aircraft, such as taxi, takeoff, cruise, descent, final approach, landing, and the like. Indeed, the performance limitation system 34 may dynamically modify the manner in which the indicator of the performance limitation parameter is presented as a function of the flight phase or operating condition. For example, when the performance limitation relates to a maximum altitude of the aircraft, the graphical display of the performance limitation can be modified dynamically as a function of a current altitude of the aircraft. Another example of a context-specific condition is an actual performance and/or operating condition of the aircraft. For example, altitude may be considered when displaying a maximum speed performance limitation. For example, at altitude A, the performance limitation might be to operate below speed X, and at altitude B, the performance limitation might be to operate below a speed Y. The display of the indicator of the given performance limitation can be adjusted automatically and dynamically based on the actual operating condition of the aircraft, thereby avoiding pilot memory about when the performance limitation changes. In other words, the performance limitation for a given parameter might be different depending on the operating conditions or flight phase of the aircraft.

The context-specific condition may be used to determine whether the limitation parameter is critical and/or applicable to a current situation of the aircraft or to a possible future situation of the aircraft. In the case of a current situation, the indicator may be made more prominent or visually imposing than for a possible future situation. The indicator may also be provided a different color and/or size depending on the context-specific condition. In some embodiments, the indicator may be provided as a dynamic indicator instead of a static indicator, by flashing or otherwise changing its graphic presentation. Audio may be included with the indicator, such as a buzzing or ringing sound, when the limitation parameter is applied to a parameter relevant to a current situation of the aircraft. Other embodiments may also apply to bring the presence of the indicator to the attention of the flight crew in a critical situation. Note that a distinction may be made between a critical limitation and an applicable limitation. In the case of a critical limitation, the indicator may be displayed in a very prominent manner, whereas in the case of an applicable situation that is not critical, the indicator may be displayed in a less prominent manner.

The limitation parameter system 34 may be configured to retrieve the context-specific condition from a memory, such as memory 38 or another memory provided within the aircraft 10. Retrieval may be triggered upon receipt of the reconfiguration information and/or the non-normal event information. The system 34 may also, in some embodiments, receive the context-specific condition as part of the non-normal event information and/or the reconfiguration information, or separately therefrom.

Also optionally, the method 48 may further adapt or change the display of the performance limitation parameter when the context-specific condition changes, as illustrated in FIG. 4. For example, if the fight phase or operating conditions change and the aircraft or system parameter to which the limitation parameter is applied becomes relevant to operation of the aircraft and/or critical, then display of the indicator may change from a low-key or moderate-type display to an attention-drawing or visually imposing display. Similarly, if the speed of the aircraft increases to within a predetermined threshold of the limitation parameter, the display of the indicator may be adapted accordingly in order to further draw the attention of the flight crew.

Figure 5:
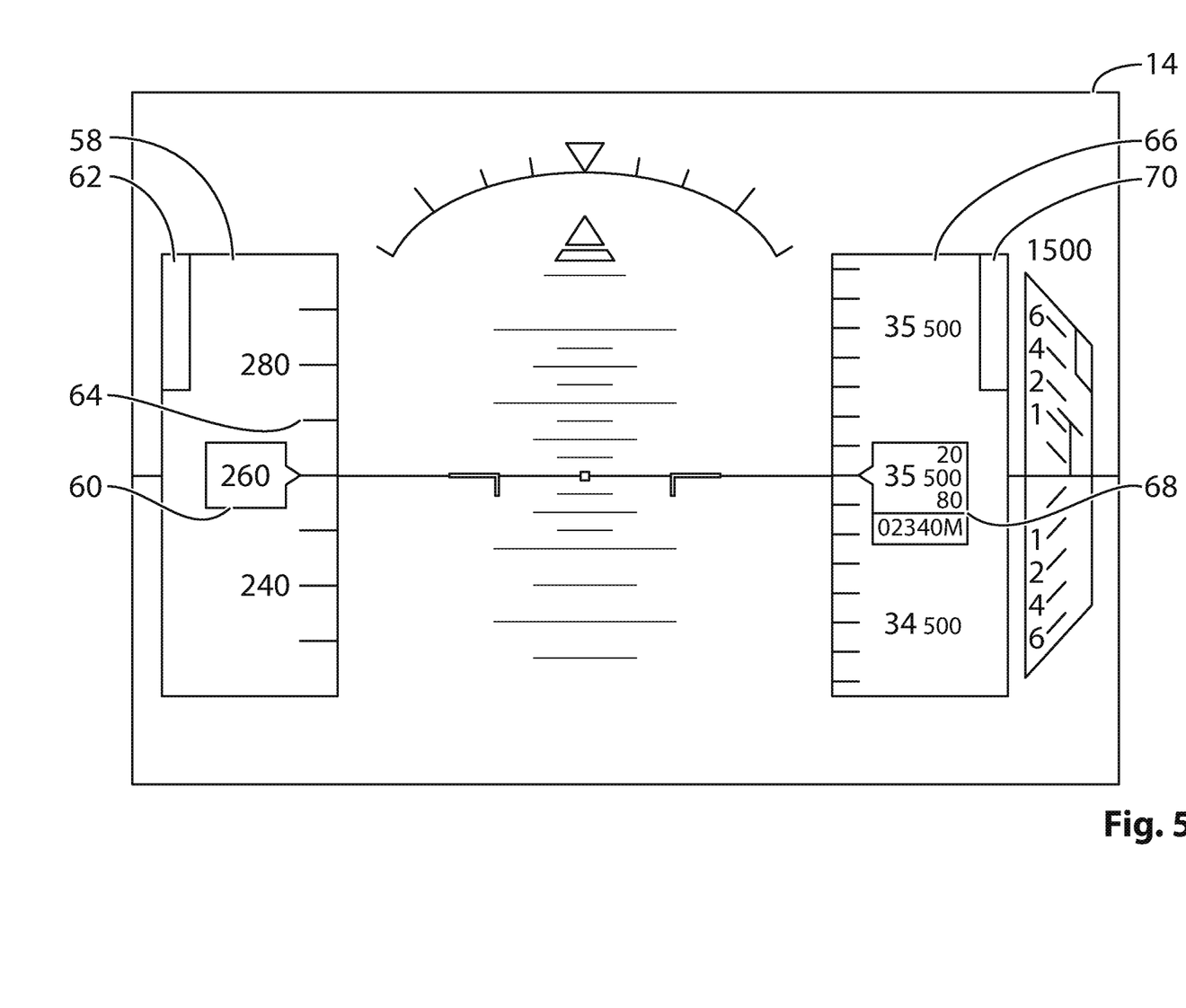
FIG. 5 is an example of a primary flight display with overlaid indicators of performance limitation.

FIG. 5 is an example of display device 14 displaying part of a PFD. An airspeed indicator 58 shows current airspeed 60 to be 260 knots. Airspeed performance limitation indicator 62 is overlaid on top of the airspeed indicator 58 to display a limitation parameter relating to airspeed. In this example, the indicator 62 informs the pilot that the aircraft speed should not be increased beyond 280 knots. A threshold 64 may be set at 270 knots. When the aircraft airspeed reaches the threshold 64, the indicator 62 may be modified in size, color, format, and/or state (i.e. dynamic), and an audio component may be added. When the aircraft speed decreases sufficiently such that it falls below the threshold 64, the indicator 62 may be further modified to return to the presentation shown in FIG. 5.

While indicator 62 is shown to overlay the primary display of the aircraft speed, i.e. the airspeed indicator, it may also be provided adjacent to or in the vicinity of the aircraft speed, such that the indicator of the limitation parameter and the corresponding aircraft or system parameter are co-located, and the relationship between the indicator 62 and the airspeed indicator 58 would be understood by the crew.

Also displayed in FIG. 5 is an altimeter 66 which shows current aircraft altitude 68 to be 35,500 ft. Attitude performance limitation indicator 70 is overlaid on the altimeter 66 to display a limitation relating to altitude. In this example, the indicator 70 informs the pilot that the aircraft altitude should not be increased beyond 35 900 ft. The values used herein are for illustrative purposes only.

The airspeed performance limitation indicator 62 and altitude performance limitation indicator 70 are illustrated as bars that span from a lower limit value upwards on the airspeed indicator 58 and altimeter 66, respectively. The indicators 62, 70 may also be embodied in other manners, such as using various symbols positioned on a graphical display, or graphical differentiators such as color, shading pattern, etc. that differentiate available operating values from non-available operating values. The symbols may be strategically located to correspond to a given value or range on a graphical display. Indicators may also be provided as numerical values, such as specific values indicative of maximum or minimum limits and percentage values indicative of a reduction in capability. Indicators may also be provided as text, with words like "limit", "maximum", or "minimum" positioned on a graphical display to correspond to the limitation parameter. Combinations of symbols, numerical values, graphical differentiators and text may also be used. In some embodiments, an existing graphical display is shaded in a particular manner to indicate a specific range of available operating conditions for a given aircraft or system parameter. Other embodiments may also apply.

In some embodiments, the indicator 62, 70 may be selected from a set of possible symbols or graphical presentations as a function of the performance limitation. For example, a performance limitation that reduces an original capability by a small margin, such as 5% or 10%, may correspond to a first set of symbols. A performance limitation that reduces an original capability by a medium margin, such as 20% or 25%, may correspond to a second set of symbols. A performance limitation that reduces an original capability by a large margin, such as 50% or more, may correspond to a third set of symbols. The thresholds used to classify the performance limitation and/or the number of categories associated with different symbols may vary and be set by a manufacturer of the system 34, an operator of the aircraft 10, and/or the flight crew. Within each category of performance limitation, there may be more than one available symbol. Symbols of a same category may have a common color, a common format, a common size, and the like.

In some embodiments, the indicator 62, 70 may be selected from a set of possible symbols or graphical presentations as a function of the aircraft or system parameter to which the limitation parameter applies. For example, there may be a specific color, size, format, and the like for classes or groups of aircraft or system parameters. Classes or groups may be defined as desired. For example engine parameters may be grouped together in a single group, or using a plurality of sub-groups. Within each class or group of aircraft or system parameter, there may be more than one available symbol. Symbols of a same class or group may have a common color, a common format, a common size, and the like. The groupings/classes may be defined by a manufacturer of the system 34, an operator of the aircraft 10, and/or the flight crew.

Figure 6:
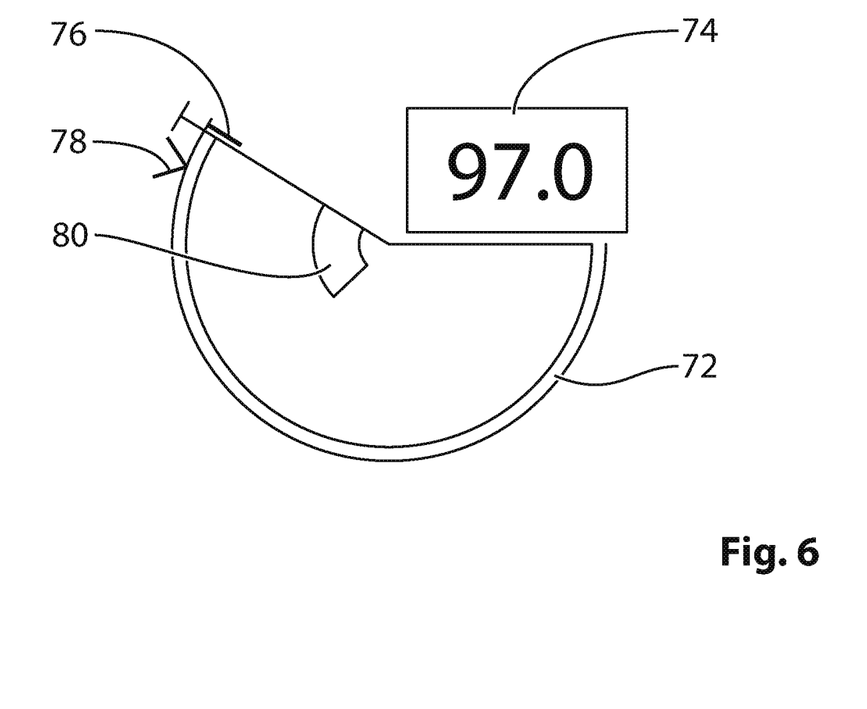
FIG. 6 is an example of a cockpit gauge with an overlaid indicator of performance limitation.

In some embodiments, the indicator corresponds to an available range for a given parameter in accordance with a given performance limitation, as illustrated in the example of FIG. 6. Gauge 72 presents a compound thrust parameter in percent based on an engine manufacturer defined maximum thrust, that corresponds to 100%. A current reading 74 indicates 97%. Marker 76 indicates the maximum thrust, i.e. 100%. Pointer 78 is a reference bug which may be preset by the pilot to indicate appropriate thrust for the current conditions. Performance limitation indicator 80 is used to display to the pilot an available range of operating states for the high pressure engine spool as a result of an in-flight aircraft reconfiguration. Note that indicator 80 differs from marker 76 which is always present and identifies original or standard operating limits of the aircraft. Indicator 80 also differs from pointer 78 which is movable and may be set as desired by the flight crew. In contrast, indicator 80 corresponds to a limitation parameter generated as a result of an in-flight reconfiguration of the aircraft 10. Indicator 80 is displayed so as to be co-located with an aircraft or system parameter to which a limitation parameter applies, the limitation parameter having been generated as a result of the reconfiguration. Indicator 80 thus differs from traditional graphic presentations, such as markers, reference bugs, and the like, provided on display devices 14 of aircraft 10.

In some embodiments, the indicator of the performance limitation is only displayed upon receipt of a request to display the performance limitation parameter. The request may be provided by a member of the flight crew via one or more of the data input devices illustrated in FIG. 1. The request may also be formulated with a checklist, for example as an item in the checklist that is either accepted or rejected by the pilot as he or she goes through the checklist. Other methods of receiving a display request may also be used.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method comprising:
    acquiring reconfiguration information of an aircraft upon detection of a non-normal event in-flight, the reconfiguration information comprising at least one performance limitation of at least one aircraft or system parameter as a result of the non-normal event; and
    displaying a graphical indicator of the at least one performance limitation co-located with a display of the at least one aircraft or system parameter by overlaying the graphical indicator on the display of the at least one aircraft or system parameter;
    wherein the at least one aircraft or system parameter is displayed on a primary flight display of a flight deck of the aircraft; and
    wherein displaying the graphical indicator of the least one performance limitation comprises displaying an available range of the at least one aircraft or system parameter in relation to a current value of the at least one aircraft or system parameter, the available range differentiating available operating values of the at least one aircraft or system parameter from non-available operating values of the at least one aircraft or system parameter.

2. The method of claim 1, further comprising dynamically adapting display of the graphical indicator of the at least one performance limitation as a function of at least one context-specific condition.

3. The method of claim 2, further comprising updating display of the graphical indicator of the at least one performance limitation when the at least one context-specific condition changes.

4. The method of claim 3, wherein the context-specific condition is a flight phase in which the aircraft is currently operating.

5. The method of claim 1, wherein displaying the graphical indicator comprises selecting a symbol for the graphical indicator as a function of at least one of the at least one performance limitation and the at least one aircraft or system parameter.

6. The method of claim 1, further comprising receiving a request to display the at least one performance limitation parameter.

7. The method of claim 6, wherein the request is formulated within a checklist generated as a result of the non-normal event.

8. A system comprising:

a processing unit; and a memory communicatively coupled to the processing unit and comprising computer-readable program instructions executable by the processing unit for:

acquiring reconfiguration information of an aircraft upon detection of a non-normal event in-flight, the reconfiguration information comprising at least one performance limitation of at least one aircraft or system parameter as a result of the non-normal event; and displaying a graphical indicator of the at least one performance limitation co-located with a display of the at least one aircraft or system parameter by overlaying the graphical indicator on the display of the at least one aircraft or system parameter;

wherein the at least one aircraft or system parameter is displayed on a primary flight display of a flight deck of the aircraft; and wherein displaying the graphical indicator of the least one performance limitation comprises displaying an available ramie of the at least one aircraft or system parameter in relation to a current value of the at least one aircraft or system parameter, the available ramie differentiating available operating values of the at least one aircraft or system parameter from non-available operating values of the at least one aircraft or system parameter.

9. The system of claim 8, wherein the computer-readable program instructions are further executable for dynamically adapting display of the graphical indicator of the at least one performance limitation as a function of at least one context-specific condition.

10. The system of claim 9, wherein the computer-readable program instructions are further executable for updating the graphical indicator of the at least one performance limitation when the at least one context-specific condition changes.

11. The system of claim 10, wherein the context-specific condition is a flight phase in which the aircraft is currently operating.

12. The system of claim 8, wherein displaying the graphical indicator comprises selecting a symbol for the graphical indicator as a function of at least one of the at least performance limitation and the at least one aircraft or system parameter.

13. The system of claim 8, wherein the computer-readable program instructions are further executable for receiving a request to display the at least one performance limitation parameter.

14. The system of claim 13, wherein the request is formulated within a checklist generated as a result of the non-normal event.

15. A graphical user interface of an aircraft comprising:

a graphical display of at least one aircraft or system parameter; and a graphical indicator of at least one performance limitation overlaid with the graphical display of the at least one aircraft or system parameter, the at least one performance limitation resulting from a reconfiguration of the aircraft upon detection of a non-normal event in-flight, wherein the at least one aircraft or system parameter is displayed on a primary flight display of a flight deck of the aircraft; and wherein the graphical indicator comprises an available range of the at least one aircraft or system parameter in relation to a current value of the at least one aircraft or system parameter, the available range differentiating available operating values of the at least one aircraft or system parameter from non-available operating values of the at least one aircraft or system parameter.

16. The graphical user interface of claim 15, wherein the graphical indicator comprises a symbol associated with at least one of the at least one performance limitation and the at least one aircraft or system parameter.

* * * * *